Feb. 4, 1936.  M. FRIEDLAND  2,029,418

REFLEX SHUTTER

Filed March 6, 1933    4 Sheets-Sheet 1

Max Friedland
Inventor

Max Friedland
Inventor

Patented Feb. 4, 1936

2,029,418

UNITED STATES PATENT OFFICE 2,029,418

REFLEX SHUTTER

Max Friedland, New York, N. Y.

Application March 6, 1933, Serial No. 659,742

28 Claims. (Cl. 88—16)

The invention is a continuation in part of my patent application Serial No. 611,325 dated May 14, 1932, and relates to improvements in reflex shutters for reflex cameras. The objects of the invention are, first, to provide a reflex shutter suitable for use in a reflex motion picture camera, to enable the photographer to view and adjust the focus during all portions of a motion picture exposure, while the object being photographed moves toward or away from the camera; second, to provide a reflex shutter, with a stationary opaque outer casing operating as a light trap in conjunction with the shutter, to prevent light entering the reflex camera through the viewing ground glass, from reaching and affecting the sensitive film, and to prevent the possibility of such light mixing with and weakening the image light rays admitted from the lens during the exposure of the film; third, to provide a reflex shutter, with a stationary opaque mirror guard for shielding the reflex surface of the shutter, to prevent reflected rays from the reflex surface, mixing with the image rays from the lens, during any portion of the exposure of the sensitive film; fourth, to provide a reflex shutter suitable for use within the limited focal length of a 9 mm. or 16 mm. reflex motion picture camera; fifth, to provide a reflex shutter suitable for use in a reflex motion picture camera equipped with turret lenses; sixth, to provide a reflex shutter that will operate to secure clear and sharply defined negatives, in a reflex camera.

The invention is illustrated in the accompanying drawings, in which.

Figures 3, 4, 5, 6, 7, 8, 9:
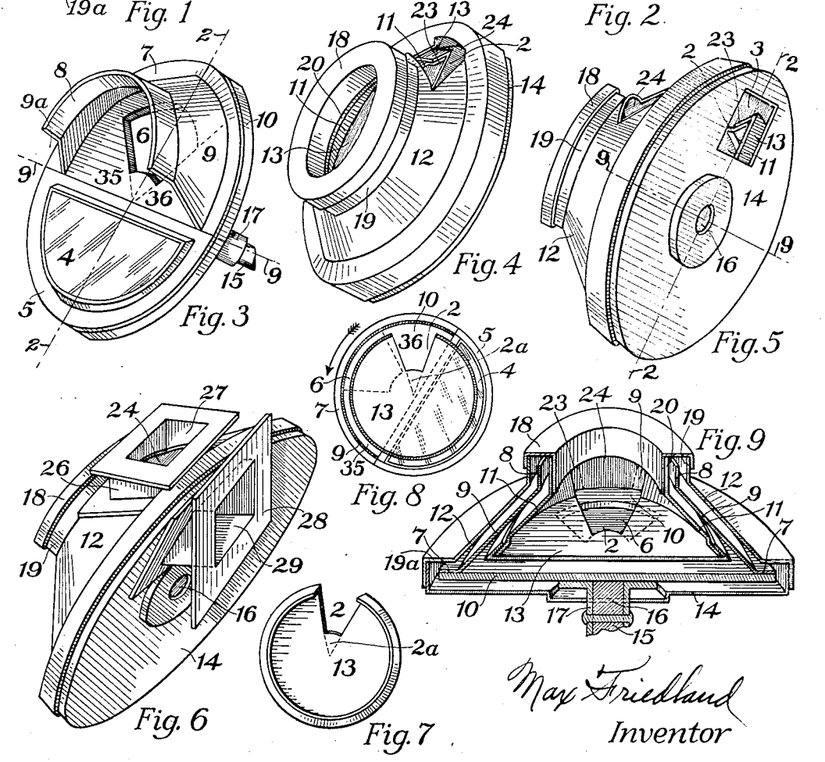
Fig. 3, a perspective view of the shutter.
Figs. 4 and 5, perspective views of the outer casing of the shutter.
Fig. 6, a perspective view of the outer casing, and auxiliary light guards.
Fig. 7, a perspective view of the mirror guard of the shutter.
Fig. 8, a plan view of the mirror guard and shutter.
Fig. 9, a perspective cross section view of the shutter, mirror guard and outer casing taken on line 9 in Figs. 3 and 5.

As shown in Fig. 3, the primary shutter 10 is an opaque circular disk to which is attached collar 17, shaft 15, reflex mirror 4, and the opaque secondary shutter, frustum 9. When rotary motion is applied to shaft 15, primary shutter 10, mirror 4 and secondary shutter 9, revolve as one unit. The surface of primary shutter 10 is divided into four sectors. The surfaces of two of these sectors, 35 and 36, are dull, black and non-reflecting, and equal to each other in area and included angle. Primary aperture 6 occupies a third sector, in a position between non-reflecting sectors 35 and 36; and the mirror 4 occupies the remaining fourth sector, also in a position between sectors 35 and 36. The secondary shutter 9 has a secondary aperture 9a, and two flanges 7 and 8 extending along its circular margins at an angle to its generatrix sides. Flange 8 is at right angles to the surface of shutter 10, and flange 7 is parallel to, and welded or fastened to, the surface of shutter 10. Mirror frame 5 encloses mirror 4, and is welded or fastened to the surface of shutter 10. Primary shutter 10, secondary shutter 9 and mirror 4, revolve within the stationary opaque outer casing 11, 12, 13, 14 and 18. The outer casing of the shutter comprises a rear disk 14, a front mirror guard disk 13, an outer frustum 12, an inner frustum 11 and a rim cap 18. Mirror guard 13 is welded or fastened to inner frustum 11. Figs. 4 and 5 show perspective views of the front and rear of the outer casing of the shutter. Fig. 6 shows a perspective view of the outer casing of the shutter, with the attached auxiliary light guards 26 and 28, for the ground glass 25 and sensitive film 30, respectively.

Figure 1:
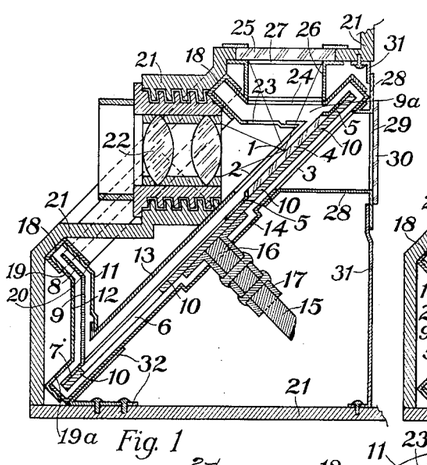
Fig. 1 is a cross section view of a reflex camera with the shutter closed.
Figure 2:
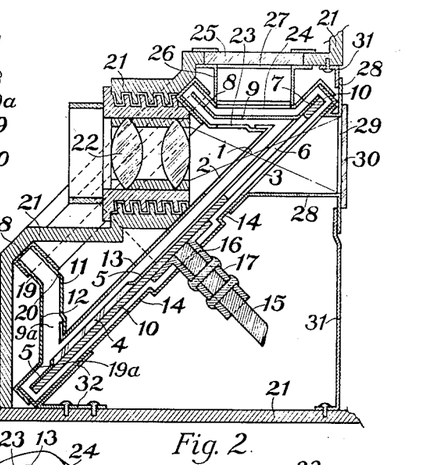
Fig. 2, a cross section view of a reflex camera with the shutter open taken on line 2 in Figs. 3 and 5.
Figures 26, 27, 28:
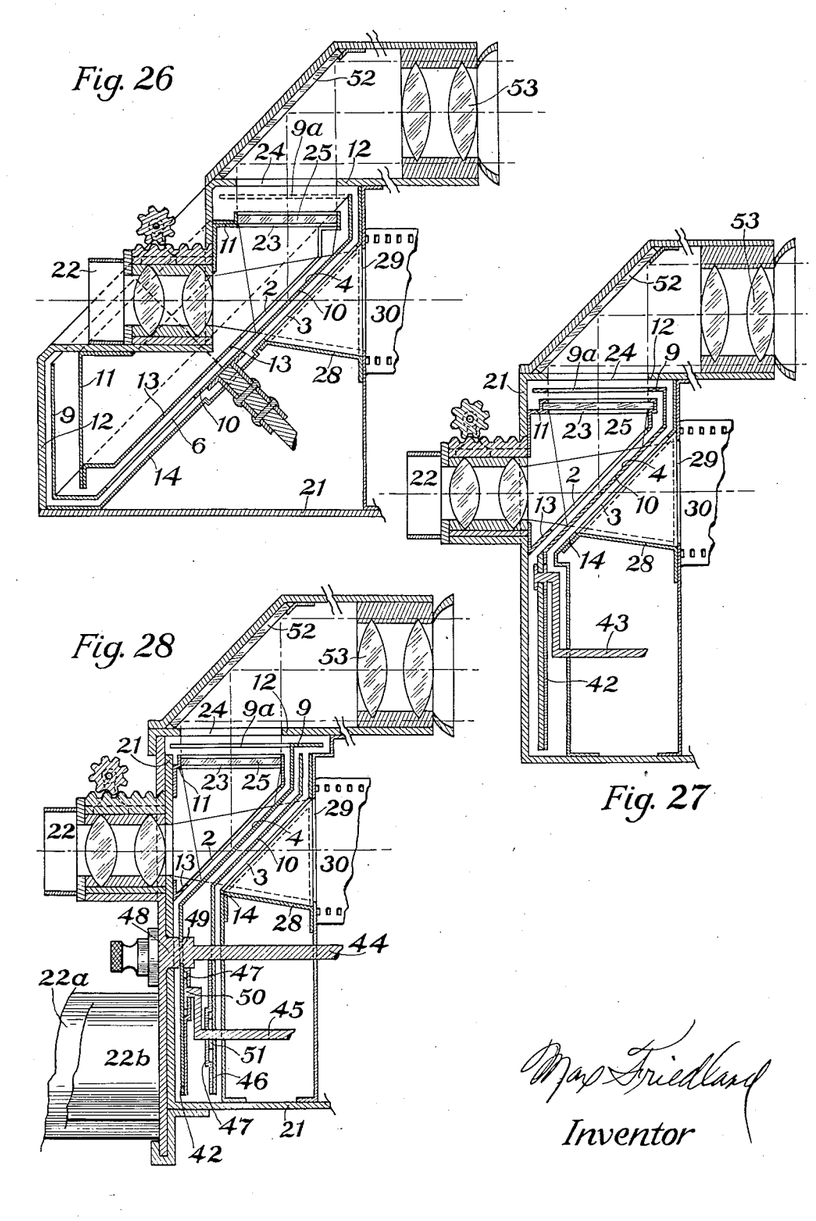

Figs. 1 and 2 are cross section views taken on line 2 in Fig. 5, showing the shutter 9 and 10 and its outer casing 11, 12, 13, 14 and 18, tilted at an angle to the axis of lens 22, in the reflex camera. The front mirror guard disk 13 of the outer casing, has an aperture 2 within a sector 2a of its surface, for the admission of light from lens 22, to mirror 4 and to sensitive film 30. Inner frustum 11 of the outer casing, has an aperture 23 for the admission of light to ground glass 25. Outer frustum 12 of the outer casing, has an aperture 24 for the admission of light to ground glass 25. Rear disk 14 of the outer casing, has an aperture 3 for the admission of light to sensitive film 30; and an aperture 16 which admits shaft 15 and collar 17 of shutter 10. The outer casing 11, 12, 13, 14 and 18 is held stationary by the auxiliary guards 26 and 28, rim cap 18 and supporting members 31 and 32, which are welded or fastened to the outer casing and to walls 21 of the camera. Outer frustum 12 has a flange 19, parallel to the path of motion of flange 8 of secondary shutter 9, and a flange 19a parallel to the plane of motion of shutter 10. Inner frustum 11 has a flange 20, parallel to the path of motion of flange 8 of secondary shutter 9. Ground glass 25 may be placed within either of the two apertures 23 and 24 of the outer casing, or within aperture 27 of auxiliary guard 26, provided however that the distance from focal point 1 to ground glass 25 and to sensitive film 30 is the same in each instance. This construction is shown in Figs. 26, 27 and 28.

As shown in Fig. 1, the film 30 is shielded by primary shutter 10 while mirror 4 reflects the image rays from lens 22, through the aperture 9a and through the apertures 23 and 24, to ground glass 25. The image is viewed in ground glass 25, and lens 22 is adjusted to the proper focus.

In Fig. 2, the shutter 10 has revolved through an angle of 180 degrees. Primary aperture 6 of shutter 10 now permits light from lens 22 passing aperture 2 of mirror guard 13, to pass aperture 3 of rear disk 14 of the outer casing, to sensitive film 30. Since the distance from focal point 1, to sensitive film 30 and to ground glass 25 is exactly the same, the image that was observed and focused at ground glass 25 in Fig. 1 is now in the same focus and relative position on sensitive film 30. The secondary shutter 9 has revolved through an angle of 180 degrees with primary shutter 10, and shields aperture 24 and ground glass 25. The shutter revolves once for each exposure made.

Primary shutter 10, and secondary shutter 9 with its flanges 7 and 8, form a light trap in conjunction with the stationary outer casing 11, 12, 13, 14 and 18, that shields film 30 during every portion of the shutter's motion, from light entering the camera through ground glass 25. Any light that enters through the ground glass 25 while film 30 is being exposed, is guided around the exterior side of secondary shutter 9, by outer frustum 12, and is kept from reaching the sensitive film by inner frustum 11, mirror guard 13, rear disk 14 and flanges 7, 8, 19a and 20. An improved form of light trap construction of the shutter and its outer casing is shown in Figs. 11 and 15, in which the primary shutter 10 has a primary frustum 38; and the inner frustum 11 of the outer casing has an extension 37 which shields the exterior surface of primary frustum 38, and also shields the space between shutter 10 and mirror guard 13.

The function of the mirror guard 13 of the outer casing, is to shield the reflex surface, mirror 4 of shutter 10, to prevent image rays from lens 22 reaching the reflex surface 4 and reflecting back, during the exposure of film 30. Such reflected rays would mix with, and confuse and weaken the image rays; and would tend to produce hazy and indistinct negatives. The opaque surface of mirror guard 13 prevents this possibility, in conjunction with the non-reflecting sectors 35 and 36 of shutter 10. The included angles of sectors 35 and 36 are each equal to or greater than, the included angle of sector 2a of mirror guard 13. As shown in Fig. 8, shutter 10 has revolved in the direction of the arrow, and aperture 6 has completed its function of exposing film 30. Non-reflecting sector 36 now shields aperture 2; and mirror 4 remains shielded by the opaque portion of mirror guard 13. Mirror 4 appears within aperture 2 after the film 30 is fully shielded by shutter 10. Thus, due to the relative positions of sectors 35 and 36, and aperture 6; and the degree of the included angle of sector 2a which contains aperture 2, relative to the degree of each of the included angles of sectors 35 and 36, the reflex action of mirror 4 when the shutter is revolved in either direction, can begin only after aperture 6 has completed its function of exposing film 30.

During each revolution of shutter 10, two simultaneous shieldings of ground glass aperture 24 and film aperture 3 take place, before and after each exposure of film 30; due to the fact that secondary shutter 9 extends around that portion of the circumference of shutter 10 which includes aperture 6 and sectors 35 and 36.

Figures 10, 11, 12, 13, 14, 15, 16:
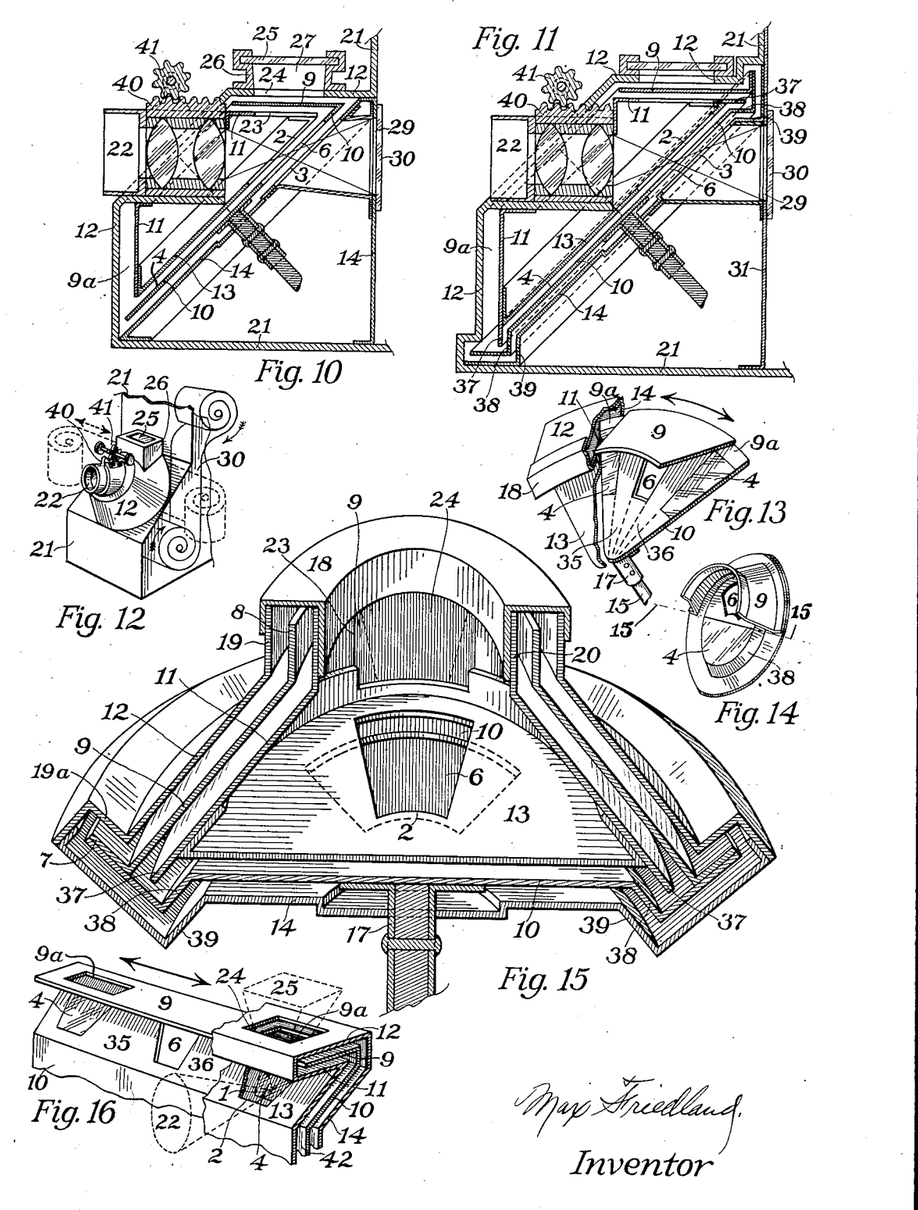
Fig. 10, a cross section view of a simplified compact construction.
Fig. 11, a perspective cross section view of the shutter, showing primary and secondary frustums.
Fig. 12, a perspective view of the front of a reflex camera, adapted to the shutter.
Fig. 13, a perspective view of the construction adapted to an oscillating shutter.
Fig. 14, a perspective view of the shutter showing primary and secondary frustums.
Fig. 15, a perspective cross section view of the shutter taken on line 15 in Fig. 14.
Fig. 16, a perspective view of the construction adapted to a reciprocating shutter.

Fig. 10 shows a simplified construction of the shutter and outer casing, in which the flanges 7, 8, 19, 19a and 20, rim cap 18 and mirror frame 5, are omitted. A brightly polished surface 4 is used instead of a mirror as the reflex portion of the shutter 10. The outer frustum 12 of the outer casing of the shutter is made a portion of the exterior wall 21 of the camera. Rear wall 14 of the outer casing performs its own function as well as that of supporting member 31 in Fig. 1. The lens 22 is focused by means of a rack and pinion 40—41.

Shutter 10 in Fig. 11, has a primary frustum 38 shielded by an extension 37 of inner frustum 11. Extension 37 shields the space between the rear surface of mirror guard 13 and the front surface of shutter 10, from light entering the shutter through the ground glass 25. The primary frustum 38 of shutter 10 is shown in perspective in Fig. 14.

Fig. 12 is a perspective view of a reflex camera, in which the outer frustum 12 of the outer casing of the shutter, constitutes a portion of the exterior wall of the camera. The ground glass 25 and the auxiliary light guard 26 are shown on the exterior side of frustum 12. The roll film 30 may be placed in either of two positions shown by the solid and dotted lines, and the direction of film wind is indicated by the solid and dotted arrows.

In Fig. 13, the construction of shutter 10 and its outer casing 11, 12, 13, 14 and 18, is adapted for use with oscillating motion applied to the shutter, instead of revolving motion. Shutter 10 swings once, in either direction shown by the arrow, to make one picture exposure. The reflex surface 4 and the secondary aperture 9a are each divided into two parts. One of the reflex surfaces 4 is brought into alignment with aperture 2 of the front wall 13 of the outer casing, at the completion of each picture exposure, by any well known means for imparting a constant degree of oscillation to a follower, with shaft 15, primary shutter 10, reflex surfaces 4—4 and secondary shutter 9 constituting the follower of such well known means.

Fig. 15 is a cross section perspective view taken on line 15 in Fig. 14, of shutter 10, and includes a cross section view of the outer casing, combining the two constructions used in Fig. 9 and Fig. 11. Extension 37 of inner frustum 11 is parallel to primary frustum 38 of shutter 10, and shields both the exterior surface of frustum 38, and the space between the rear surface of mirror guard 13 and the front surface of shutter 10. Rear disk 14 of the outer casing is parallel to the plane of motion of shutter 10, and has a frustum 39 parallel to the path of motion of primary frustum 38.

Figures 17, 18:
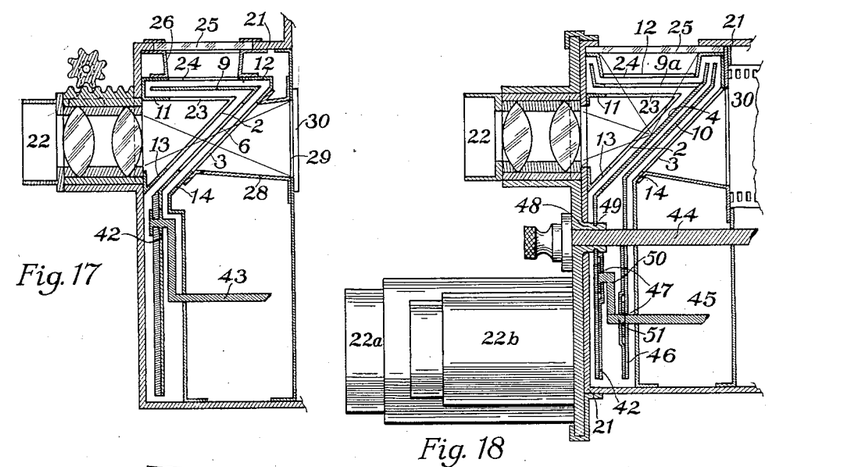
Fig. 17, a cross section view of a reflex camera and reciprocating shutter.
Fig. 18, a part cross section view of a turret lens motion picture camera and an intermittently reciprocating reflex shutter.

Fig. 16 shows the construction of the shutter and outer casing as adapted to reciprocating motion, instead of revolving or oscillating motion. Primary shutter 10, reflex surfaces 4 and secondary shutter 9, move in a direction parallel to the field of lens 22. Primary shutter 10 and reflecting surfaces 4 are tilted at an angle to the axis of lens 22. One full motion of the shutter in either direction indicated by the arrows, produces one picture exposure. Secondary shutter 9 has two secondary apertures 9a, in line with and above the reflecting surfaces 4—4. As shown in Fig. 17, the revolving shaft 43 by means of a connecting rod or scotch yoke, imparts constant reciprocating motion through extension 42, to shutter 10. In this type of reciprocating shutter as shown in Figs. 16 and 17, the length of the outer casing must be approximately nine times, and the length of the shutter about five times, the width of aperture 2, respectively. Extension 42, primary shutter 10, reflex surfaces 4—4 and secondary shutter 9 are to be guided in a straight line by means similar to that used for guiding the motion of reflex member 4 and extension 42 in Fig. 18.

Figure 19:
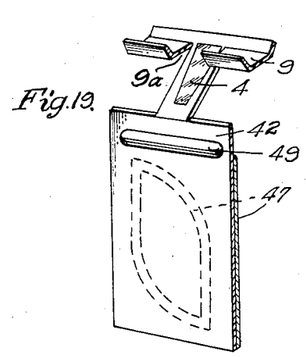
Fig. 19, a perspective view of the secondary shutter and reflex surface of an intermittently reciprocating reflex shutter.
Figure 20:
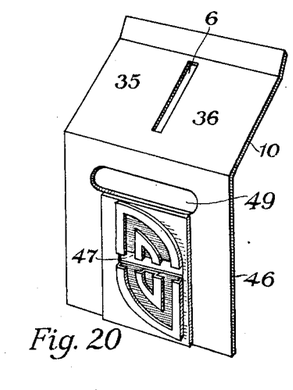
Fig. 20, a perspective view of the primary shutter of an intermittently reciprocating reflex shutter.
Figure 21:
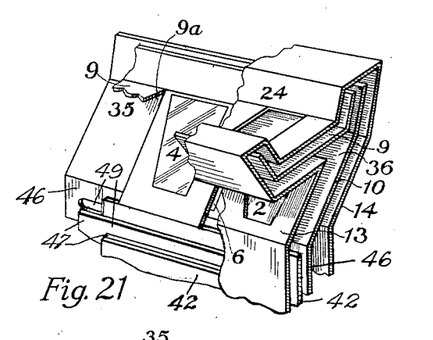
Fig. 21, a fragmentary perspective view of an intermittently reciprocating reflex shutter.
Figure 22:
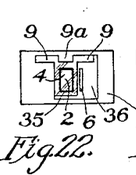
Figs. 22, 23, 24 and 25, graphs showing the stages of motion of an intermittently reciprocating reflex shutter, and Figs. 26, 27 and 28, cross section views showing means for viewing the reflected image in a plane parallel to the picture field of the camera.
Figure 23:
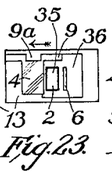
Figures 24, 25:
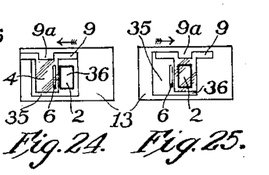

An intermittently reciprocating shutter is shown in Figs. 18 and 21. In this construction, the length of the outer casing is only approximately five times, and the length of the shutter only three times, the width of aperture 2, respectively. Primary shutter 10, shown in perspective in Fig. 20, has two non-reflecting sectors 35 and 36, and a primary aperture 6; which latter is preferably a narrow slit, producing the effect of a focal plane shutter. Primary shutter 10 is tilted at an angle to the axis of lens 22, and reciprocates intermittently, in a direction parallel to the field of lens 22. Secondary shutter 9 and reflecting surface 4 form one unit, as shown in Fig. 19, and reciprocate intermittently, independent of the motion of primary shutter 10. Reflecting surface 4 moves in a plane at an angle to the axis of lens 22, intermediate shutter 10 and mirror guard 13 of the outer casing. Secondary shutter 9 moves in a plane at an angle to the reflex surface 4, and has a secondary aperture 9a in line with and above the reflex surface 4. In Fig. 18, the turret lens 22, 22a and 22b provides varied lenses for telephoto or wide angle photography, and revolves on shaft 44. As shown, shaft 44 may be carried through the projections 42 and 46 of the primary and secondary shutters, and through the body of the camera, to give added strength to the construction. The slots 49 in extensions 42 and 46 of the primary and secondary shutters, function as guides on bushing 48 and on a similar projection in line with bushing 48, guiding the straight line motion of the shutters. Shaft 45 imparts intermittent reciprocating motion individually to both the primary and secondary shutters, by means of two arms and headed pins 50—51, set at an angle of ninety degrees, and working within guides 47, which latter are attached to parts 42 and 46. A secondary reflecting surface 52 and a secondary lens 53, as shown in Figs. 26, 27 and 28, may be attached to the exterior of the reflex camera, at an angle to the viewing ground glass, to provide means for viewing the reflected image in a plane parallel to the picture field.

Figs. 22, 23, 24 and 25 illustrate the cycle of intermittent reciprocating motion imparted to primary shutter 10, and to secondary shutter 9 and reflex surface 4, which motion comprises four stages to complete one picture exposure; the same four stages being repeated in an opposite direction to complete a second picture exposure. In the first stage shown in Fig. 22, the reflex surface 4 is in line with aperture 2 of the outer casing, and aperture 9a is therefore in line with apertures 23 and 24 of the outer casing; aperture 6 of primary shutter 10 is shielded by the front wall of the outer casing, mirror guard 13; and sector 35 shields aperture 3, and is in a position directly behind reflex surface 4 and aperture 2. In the second stage, Fig. 23, reflex surface 4 moves to the left and is shielded by mirror guard 13; secondary shutter 9 also moves to the left and shields apertures 23 and 24; primary shutter 10 remains stationary, and non-reflecting sector 35 shields aperture 2. In the third stage, Fig. 24, primary shutter 10 moves to the left, while the secondary shutter 9 and reflex surface 4 remain stationary; aperture 6 thus moves past apertures 2 and 3, and admits light to the sensitive film 30; primary shutter 10 remains stationary after having moved to the left, so that aperture 6 remains shielded by mirror guard 13, and non-reflecting sector 36 shields aperture 2. In the fourth stage, Fig. 25, primary shutter 10 remains stationary, and reflex surface 4 and secondary shutter 9 move to the right and then remain stationary if the motion of crank 45 is stopped at this point, with reflex surface 4 in line with aperture 2, and aperture 9a in line with apertures 23 and 24. This completes the cycle of one picture exposure, and is repeated in the opposite direction to make a second exposure. In the first and second stages, of the above cycle when repeated to produce a second picture exposure, the sector 36 performs the function of sector 35, and in the third stage sector 35 performs the function of sector 36.

Figs. 26, 27 and 28, are cross section views of revolving, reciprocating and intermittently reciprocating shutters, respectively. In these views the ground glass 25 is placed within the aperture 23 of the inner secondary wall 11 of the outer casing, and is situated between the secondary shutter 9 and the lens 22. The secondary reflecting surface 52 and the secondary lens 53 provide means for viewing the image in a plane parallel to the picture field of the camera.

The shutters described herein, operate to provide clear sharply defined negatives, by shielding the sensitive film from any source of light other than image rays directly from the lens. The described functions which shield the film from ground glass light and reflected rays, are absolutely essential, particularly when hypersensitive and other high speed films are used, since the presence of any extraneous light would immediately register on such films and become apparent in the negatives and positives produced.

I am aware that reflex shutters have been patented prior to my above disclosure and invention.

I claim:

1. A reflex shutter comprising a primary shutter, a secondary shutter and means for producing regular reflection, an outer casing comprising a front primary wall, a rear primary wall, an inner secondary wall, an outer secondary wall and connecting walls, the primary shutter and said reflecting means of the reflex shutter being situated between the front and rear primary walls, the secondary shutter being situated between the inner and outer secondary walls, the front primary wall and the inner secondary wall being situated at an angle to each other between the secondary shutter and the reflecting means of the reflex shutter, said angle being less than a straight angle, the front and rear primary walls having aligned apertures for the admission of light to a sensitive film, the inner and outer secondary walls having aligned apertures constituting means for viewing light reflected by the reflecting means of the reflex shutter, the reflex shutter being situated within the outer casing and means for imparting motion to the reflex shutter.

2. In a reflex camera, a reflex shutter comprising a primary shutter, a secondary shutter and means for reflecting light rays from the objective of the camera toward a viewing screen in the camera, means for imparting motion to the reflex shutter, a stationary partition situated between the secondary shutter and the reflecting means of the reflex shutter, the partition comprising means whereby the aperture of the secondary shutter will be shielded during that portion of said motion in which the primary shutter exposes a sensitive film in the camera, the partition having an aperture for the admission of reflected light to the viewing screen and constituting a stationary portion of the camera and the secondary shutter being situated between the partition and the viewing screen.

3. In a reflex camera, a reflex shutter comprising a primary shutter, a secondary shutter and means for reflecting light rays from the objective of the camera toward a viewing screen in the camera, a stationary partition situated between the reflecting means of the reflex shutter and the viewing screen, at an angle to the viewing screen, the partition having an aperture for the admission of light to a sensitive film in the camera and constituting a stationary portion of the camera and means for imparting motion to the reflex shutter.

4. In a reflex camera, having an objective arranged to project a beam of light therein, means for reflecting the beam at an angle to the axis of the objective, a primary shutter comprising means for alternately shielding and exposing a sensitive film in the camera, a secondary shutter comprising means for alternately shielding and exposing the viewing means of the camera, an opaque partition situated between the secondary shutter and the axis of the reflected beam and comprising means whereby the aperture of the secondary shutter will be shielded during the exposure of said film, said partition comprising a stationary portion of the camera and having an opening constituting means whereby the reflected beam may pass through said partition and means whereby said primary and secondary shutters will be moved in synchronism, whereby said film will be alternately shielded and exposed to the beam and whereby said viewing means will be alternately exposed and shielded.

5. In a reflex camera, a reflex shutter constituting an integral structure comprising a primary shutter, a secondary shutter and two reflex members comprising means for reflecting light rays from the objective of the camera toward a viewing screen in the camera, means for imparting oscillating motion to the reflex shutter, whereby the degree of oscillation of the reflex shutter will be constant during repeated cycles of said motion, the reflex shutter having an aperture for the admission of light to a sensitive film in the camera and being situated within a segment of a circle on one side of a secant of said circle, the position of said secant being fixed and constant in relation to stationary portions of the camera, the radius of the reflex shutter being equal to the radius of said circle, the center of said circle being coincident to the axis of said oscillating motion, the axes of the objective and said oscillating motion being so situated as to have extension in a common plane and the aperture in the reflex shutter being situated between the two reflex members.

6. In a reflex camera, a reflex shutter constituting an integral structure comprising a primary shutter and two reflex members comprising means for reflecting light rays from the objective of the camera toward a viewing screen in the camera, means for imparting oscillating motion to the reflex shutter, whereby the degree of oscillation of the reflex shutter will be constant during repeated cycles of said motion, the reflex shutter having an aperture for the admission of light to a sensitive film in the camera and being situated within a segment of a circle on one side of a secant of said circle, the position of said secant being fixed and constant in relation to stationary portions of the camera, the radius of the reflex shutter being equal to the radius of said circle, the center of said circle being coincident to the axis of said oscillating motion, the axes of the objective and said oscillating motion being so situated as to have extension in a common plane and the aperture in the reflex shutter being situated between the two reflex members.

7. In a reflex camera, a reflex shutter constituting an integral structure comprising a primary shutter, secondary shutter and two reflex members, the primary shutter and secondary shutter constituting means for shielding a sensitive film and a viewing screen in the camera, simultaneously, before and after exposing the film and before and after exposing the viewing screen, the two reflex members constituting means for reflecting light from the objective of the camera toward the viewing screen, means for imparting reciprocating motion to the reflex shutter, the reflex shutter having an aperture for the admission of light to the sensitive film and said aperture being situated between the two reflex members.

8. In a reflex camera, a reflex shutter comprising a primary shutter and two reflex members, the two reflex members comprising means whereby light from the objective of the camera will be reflected toward a viewing screen in the camera, means for imparting reciprocating motion to the reflex shutter and the aperture of the primary shutter being situated between the two reflex members.

9. In a reflex camera, a reflex shutter comprising a primary shutter and a reflex member, the reflex member comprising means for producing regular reflection, means for moving the reflex member, whereby the reflex member will be moved alternately, from a stationary non-functioning position exterior to one margin of an exposure frame in the camera, across a beam of light projected by the objective of the camera, to a stationary non-functioning position exterior to an opposite margin of the exposure frame, the primary shutter being situated between the reflex member and a sensitive film in the camera, means for imparting intermittent reciprocating motion to the primary shutter, whereby the primary shutter will be moved independently of the motion imparted to the reflex member and means for moving the primary shutter and reflex member in synchronism.

10. In a reflex camera having an objective arranged to project a beam of light onto a film therein and a viewing screen, a primary shutter, a reflex member, means for imparting intermittent reciprocating motion to the reflex member, the primary shutter constituting means for shielding the film during the movable intervals of the reflex member, the reflex member during said movable intervals being moved across the beam and deflecting the beam onto the viewing screen, the reflex member being held stationary in nonfunctioning positions on oppositie sides of the beam, alternately, the primary shutter constituting means for admitting the beam to the film during said stationary intervals of the reflex member, means whereby the said cycle of motion and alternate position of rest will be imparted to the reflex member, means for imparting rectilinear translation to the primary shutter, whereby the primary shutter will be moved independently of the motion imparted to the reflex member and means for moving the primary shutter and reflex member in synchronism.

11. In a reflex camera having an objective arranged to project a beam of light onto a film therein and a viewing screen, a reflex shutter comprising a primary shutter and a reflex member, the reflex member comprising means for producing regular reflection, means for imparting rectilinear translation to the reflex member, whereby the reflex member will be moved across the beam, alternately, from a non-functioning position exterior to one side of the axis of the objective, across the said axis to a non-functioning position exterior to an opposite side of the axis, means for moving the primary shutter, whereby the primary shutter will be moved independently of the motion imparted to the reflex member and means for moving the primary shutter and reflex member in synchronism.

12. In a reflex camera, having an objective arranged to project a beam of light therein, means for reflecting the beam at an angle to the axis of the objective, a shutter constituting a primary and a secondary shutter, an opaque partition situated between said shutter and the axis of the reflected beam, and comprising means in combination with said shutter whereby a sensitive film in the camera will be shielded from light entering the camera through the viewing means of the camera, said partition constituting a stationary portion of the camera and having an opening constituting means whereby the reflected beam may pass through said partition and means for moving said shutter, whereby said primary and secondary shutters will be moved in synchronism and whereby said film will be alternately shielded and exposed and said viewing means alternately exposed and shielded.

13. In a reflex-camera, a reflex shutter comprising a primary shutter, a secondary shutter and a reflex member, the reflex member comprising means for producing regular reflection, an outer casing comprising a front primary wall, a rear primary wall, an inner secondary wall, an outer secondary wall and connecting walls, the primary shutter and reflex member being intermediate the front and rear primary walls, the secondary shutter being intermediate the inner and outer secondary walls, the front and rear primary walls having aligned apertures for the admission of light to a sensitive film in the camera, the inner and outer secondary walls having aligned apertures consituting means for viewing light reflected by the reflex member, the front primary wall and the inner secondary wall being situated at an angle to each other between the secondary shutter and the reflex member, said angle being less than a straight angle, the reflex shutter being situated within the outer casing, the outer casing constituting a stationary portion of the camera and means for imparting motion to the reflex shutter.

14. In a reflex camera, a reflex shutter comprising an integral structure constituting a primary shutter, a secondary shutter and two reflex members, the reflex members comprising means for producing regular reflection, an outer casing comprising a front primary wall, a rear primary wall, an inner secondary wall, an outer secondary wall and connecting walls, the primary shutter and reflex members being intermediate the front and rear primary walls, the secondary shutter being intermediate the inner and outer secondary walls, the front and rear primary walls having aligned apertures for the admission of light to a sensitive film in the camera, the inner and outer secondary walls having aligned apertures constituting means for viewing light reflected by the reflex members, the front primary wall and the inner secondary wall being situated at an angle to each other between the secondary shutter and the reflex members, said angle being less than a straight angle, the reflex shutter being situated within the outer casing and having an aperture for the admission of light to said film, means for imparting oscillating motion to the reflex shutter, whereby the degree of oscillation of the reflex shutter will be constant during repeated cycles of said motion, the reflex shutter being situated within a segment of a circle on one side of a secant of said circle, the position of said secant being fixed and constant in relation to stationary portions of the camera, the radius of the reflex shutter being equal to the radius of said circle, the center of said circle being coincident to the axis of said oscillating motion, the axis of the objective of the camera and the axis of said oscillating motion being so situated as to have extension in a common plane, the outer casing constituting a stationary portion of the camera and said aperture in the reflex shutter being situated between the two reflex members.

15. In a reflex camera, a reflex shutter comprising an integral structure constituting a primary shutter, a secondary shutter and two reflex members, the two reflex members comprising means for producing regular reflection, an outer casing comprising a front primary wall, a rear primary wall, an inner second wall, an outer secondary wall and connecting walls, the primary shutter and reflex members being situated between the front and rear primary walls, the secondary shutter being situated between the inner and outer secondary walls, the front and rear primary walls having aligned apertures for the admission of light to a sensitive film in the camera, the inner and outer secondary walls having aligned apertures constituting means for viewing light reflected by the reflex members, the front primary wall and the inner secondary wall being situated at an angle to each other between the secondary shutter and the reflex members, said angle being less than a straight angle, the reflex shutter having an aperture for the admission of light to said film, said aperture in the reflex shutter being situated between the two reflex members, the reflex shutter being situated within said outer casing, the outer casing constituting a stationary portion of the camera and means for imparting reciprocating motion to the reflex shutter.

16. In a reflex camera, a reflex shutter comprising a primary shutter, a secondary shutter and a reflex member, the reflex member comprising means for producing regular reflection, an outer casing comprising a front primary wall, a rear primary wall, an inner secondary wall, an outer secondary wall and connecting walls, the primary shutter and reflex member being intermediate the front and rear primary walls, the secondary shutter being intermediate the inner and outer secondary walls, the front and rear primary walls having aligned apertures for the admission of light to a sensitive film in the camera, the inner and outer secondary walls having aligned apertures constituting means for viewing light reflected by the reflex member, the front primary wall and the inner secondary wall being situated at an angle to each other between the secondary shutter and the reflex member, said angle being less than a straight angle, means for imparting rectilinear translation to the reflex member, whereby the reflex member will be moved alternately, from a non-functioning position exterior to one side of the axis of the objective of the camera, across the said axis to a non-functioning position exterior to an opposite side of the axis, means for moving the primary shutter, whereby the primary shutter will be moved independently of the motion imparted to the reflex member, the reflex shutter being situated within the outer casing, the outer casing constituting a stationary portion of the camera and means for moving the primary shutter, secondary shutter and reflex member in synchronism.

17. In a reflex camera having an objective arranged to project a beam of light onto a film therein and a viewing screen, a primary shutter, a reflex member constituting means for deflecting the beam onto the viewing screen, means for moving the reflex member, whereby the reflex member will be moved alternately, from a non-functioning position exterior to one side of the axis of the objective, across the said axis to a non-functioning position exterior to an opposite side of said axis, means for imparting rectilinear translation to the primary shutter, whereby the primary shutter will be moved independently of the motion imparted to the reflex member and means for moving the primary shutter and reflex member in synchronism.

18. A reflex shutter comprising a primary shutter, a secondary shutter and means for producing regular reflection, an outer casing comprising a front primary wall, a rear primary wall, an inner secondary wall, an outer secondary wall and connecting walls, the primary shutter and said reflecting means of the reflex shutter being situated between the front and rear primary walls, the secondary shutter being situated between the inner and outer secondary walls, the front and rear primary walls having aligned apertures for the admission of light to a sensitive film, the inner and outer secondary walls having aligned apertures constituting means for viewing light reflected by said reflecting means, the front primary wall and the inner secondary wall being situated at an angle to each other between the secondary shutter and the reflecting means, said angle being less than a straight angle, the reflex shutter being situated within the outer casing, two auxiliary light guards each comprising substantially an opaque tube open at opposite ends, one of the tubes being fastened to the outer secondary wall and enclosing light passing through the aperture in the outer secondary wall, the second tube being fastened to the rear primary wall and enclosing light passing through the aperture in the rear primary wall and means for imparting motion to the reflex shutter.

19. In a reflex camera having an objective arranged to project a beam of light onto a film therein and a viewing screen, a primary shutter constituting means for alternately shielding the film and exposing the film to the beam of light, a reflex member constituting means for deflecting the beam onto the viewing screen, means for moving the reflex member, whereby the reflex member will be moved alternately, from a non-functioning position exterior to one side of the axis of the beam, across the said axis to a non-functioning position exterior to an opposite side of the axis, the primary shutter having an aperture constituting means for admitting the beam to said film, means for moving the primary shutter, whereby the primary shutter will be moved as a separate unit independently of the motion imparted to the reflex member and whereby the aperture in the primary shutter will be moved from a non-functioning position exterior to one side of said axis, across the axis to a non-functioning position exterior to an opposite side of the axis and means for moving the primary shutter and reflex member in synchronism, whereby the reflex member will deflect the beam of light onto the viewing screen before and after each exposure of the film by the primary shutter.

20. In a reflex camera, a reflex shutter comprising means for alternately shielding and admitting light to a sensitive film in the camera and means for alternately deflecting said light toward a viewing screen in the camera, means for imparting oscillating motion to the shutter, whereby the shutter will be constantly situated within a segment of a circle on one side of a secant of said circle and whereby the degree of oscillation of the shutter is constant during repeated cycles of said oscillating motion, the position of said secant being fixed and constant in relation to stationary portions of the camera, the radius of the shutter being equal to the radius of said circle, the center of said circle being coincident to the axis of said oscillating motion and the axes of the objective of the camera and said oscillating motion being so situated as to have extension in a common plane.

21. In a reflex camera having an objective arranged to project a beam of image light rays, and a viewing screen arranged to form a dihedral angle of approximately 90 degrees with a film in the camera, a reflex member comprising means for reflecting the beam at an angle to the axis of the objective, means for alternately shielding and exposing the viewing screen to the image light rays, means for alternately shielding and exposing the film to the image light rays, means for imparting rectilinear translation to the reflex member, whereby the reflex member will be moved alternately, from a non-functioning position exterior to one side of the axis of the beam, across the said axis to a non-functioning position exterior to an opposite side of the axis and means whereby the viewing screen, the film and the viewing screen and film again, in consecutive sequence, will have been exposed to the image light rays after the reflex member has been moved twice in succession across the beam.

22. In a reflex camera having an objective arranged to project a beam of image light rays and exposure frames for a viewing screen and film respectively arranged to form a dihedral angle of approximately 90 degrees, a reflex member comprising means for reflecting the beam at an angle to the axis of the objective, two walls of said camera each having an aperture and being arranged to form a dihedral angle of approximately 90 degrees, said two walls constituting exposure frames for a viewing screen and film, respectively, and means for imparting rectilinear translation to the reflex member, whereby the reflex member will be moved alternately, from a non-functioning position exterior to one side of the axis of the beam, across the said axis to a non-functioning position exterior to an opposite side of the axis and whereby the image light rays may be projected through one of the exposure frames, before and after each said alternate movement of the reflex member.

23. In a reflex camera having an objective arranged to project a beam of image light rays, two reflex members comprising means for reflecting the beam at an angle to the axis of the objective, toward a plane perpendicular to the axis of the reflected beam and means for imparting reciprocating motion to the reflex members, whereby each reflex member will be moved into alignment with the beam alternately, and whereby the beam will be reflected and will pass between the two reflex members, alternately.

24. In a reflex camera having an objective arranged to project a beam of image light rays, two reflex members comprising means for reflecting the beam at an angle to the axis of the objective and means for imparting oscillating motion to the reflex members, whereby the degree of oscillation of the reflex members will be constant during repeated cycles of said motion and whereby the beam will be reflected and will pass between the two reflex members, alternately.

25. In a reflex camera having an objective arranged to project a beam of image light rays and a viewing screen arranged to form a dihedral angle of approximately 90 degrees with a film in the camera, a reflex shutter comprising means for reflecting the beam at an angle to the axis of the objective, means for imparting oscillating motion to the shutter, whereby the degree of oscillation of the shutter will be constant during repeated cycles of said motion, the shutter being situated within a segment of a circle on one side of a secant of said circle, the position of said secant being fixed and constant in relation to stationary portions of the camera, the radius of the shutter being equal to the radius of said circle, the center of said circle being coincident to the axis of said oscillating motion, and the axes of the objective and said oscillating motion being so situated as to have extension in a common plane.

26. In a reflex camera having an objective arranged to project a beam of light therein, means for reflecting the beam at an angle to the axis of the objective, a shutter comprising a primary and a secondary shutter, means for imparting oscillating motion to the primary shutter whereby the degree of oscillation of the primary shutter will be constant during repeated cycles of said motion, the primary shutter being situated within a segment of a circle on one side of a secant of said circle, the position of said secant being fixed and constant in relation to stationary portions of the camera, the radius of the primary shutter being equal to the radius of said circle, the center of said circle being coincident to the axis of said oscillating motion, the axes of the objective and said oscillating motion being so situated as to have extension in a common plane and means whereby said primary and secondary shutters will be moved in synchronism and whereby a sensitive film in the camera will be alternately shielded and exposed and the viewing means of the camera alternately exposed and shielded.

27. In a reflex camera having an objective arranged to project a beam of light therein, means for reflecting the beam at an angle to the axis of the objective, a shutter comprising an integral structure having an opening therein and constituting a primary and a secondary shutter and means whereby reciprocating motion will be imparted to the integral structure, whereby the said opening in the integral structure will be moved alternately, from a non-functioning position exterior to one side of the axis of the beam, across the said axis, to a non-functioning position exterior to an opposite side of the said axis, whereby said primary and secondary shutters will be moved in synchronism and whereby a sensitive film in the camera will be alternately shielded and exposed to the beam and the viewing means of the camera alternately exposed and shielded.

28. In a reflex camera having an objective arranged to project a beam of light therein, means for reflecting the beam at an angle to the axis of the objective, a primary shutter, a secondary shutter and means whereby rectilinear translation will be imparted to said primary and secondary shutters, whereby the primary shutter will be moved as a separate unit independently of the motion imparted to the secondary shutter, whereby said primary and secondary shutters will be moved in synchronism and whereby a sensitive film in the camera will be alternately shielded and exposed and the viewing means of the camera alternately exposed and shielded.

MAX FRIEDLAND.